United States Patent Office 3,462,480
Patented Aug. 19, 1969

3,462,480
METHOD OF PRODUCING ORGANIC PEROXY ACIDS
Donald G. MacKellar, Trenton, John H. Blumbergs, Highland Park, and Rainer von Falkenstein, Princeton Junction, N.J., assignors to FMC Corporation, New York, N.Y., a corporation of Delaware
No Drawing. Filed Jan. 4, 1967, Ser. No. 607,140
Int. Cl. C07c 73/10, 73/12
U.S. Cl. 260—502
4 Claims

ABSTRACT OF THE DISCLOSURE

Organic peroxycarboxylic acids were produced by reaction of their precursor acyl halide and an alkali metal peroxide solution, having an active oxygen content of at least 1% by weight, in a reaction medium containing water, a tertiary alcohol having a water solubility of above about 5% by weight, and nitrilotriacetic acid (NTA).

BACKGROUND OF THE INVENTION

Field of the invention

The invention covers a process for producing organic peroxy acids by reaction of their precursor organic acyl halides with aqueous alkaline peroxide solutions.

Description of the prior art

One known method for producing organic peroxy acids is set forth in U.S. Patent 3,232,979 issued to John H. Blumbergs on Feb. 1, 1966. In this patented process a precursor acyl halide and an aqueous alkali metal peroxide solution, containing a mixture of potassium ions and sodium ions in a mole ratio of from about 1:1 to about 6:1, is reacted together in a medium comprising water and a tertiary alcohol having a water solubility above about 5% by weight. This reaction is illustrated by the following equation:

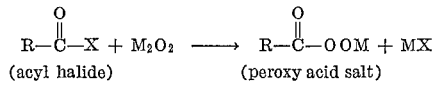

(acyl halide)   (peroxy acid salt)

where R is an organic radical, X is a halogen atom and M is a mixture of the alkali metals Na and K. In the above reaction if the weight ratio of acyl halide to tertiary alcohol is from about 1:2.0 to about 1:5, and the weight ratio of acyl halide to the total reaction mixture is from about 1:8 to about 1:15, the final mixture, upon acidification, separates into a tertiary alcohol layer containing substantially all of the peroxycarboxylic acid and an aqueous layer containing the bulk of in-situ-produced inorganic salts and substantially no peroxycarboxylic acid.

When the above process is run with laboratory size samples, the reactants can be added within a few minutes, with adequate cooling, to prevent the exothermic reaction from exceeding about 5° C. Above about 5° C., decomposition of the resultant product becomes noticeable. The ensuing reaction is completed within about one hour and good yields of the product, on the order of about 90% or above, are obtained.

When scale-up of the process to commercial production is attempted, serious problems arise. Initially, the time required to complete the reaction materially increases to as long as 3–6 hours. This increase is largely due to the slow rate at which the reactants can be added together to prevent the temperature of the reaction mixture rising above 5° C. During scale-up it becomes increasingly more difficult to remove the heat of reaction from the reaction mixture as the amount of the mixture increases, even when special cooling means are employed. To avoid exceeding a temperature of 5° C. in the reaction mixture, the reactants are added at a rate no higher than that which will permit the cooling means to remove the exothermic heat of reaction.

At these longer reaction times an unexplained drop in the assay and yield of the product occurs. While the exact reason for the decrease in yield of the final product is unknown, it is believed that it may be due to the decomposition of the intermediate product, namely the peroxycarboxylic acid salt, during the prolonged time it is present in the alkaline stage of the reaction.

As a result, there is a need for a method which will permit the scale-up of the above-described process wherein longer reaction periods are required without sacrifices in the yield and assay of the product.

SUMMARY OF THE INVENTION

It has now been found that good yields of an organic peroxycarboxylic acid can be maintained when an acyl halide of the desired precursor peroxycarboxylic acid and an aqueous, alkali metal peroxide solution containing as the alkali metals a mixture of potassium and sodium ions in a mole ratio of about 1:1 to about 6:1, are reacted in a reaction medium containing water and a tertiary alcohol having a water solubility of at least 5% by weight, for periods of time up to about 6 hours, and the resulting reaction mixture is acidified, by carrying out the reaction in the presence of a small but effective amount of nitrilotriacetic acid.

DESCRIPTION OF THE INVENTION AND THE PREFERRED EMBODIMENTS

In carrying out the process, an aqueous, mixed, alkali metal peroxide solution is prepared by mixing a dilute solution of sodium hydroxide and potassium hydroxide with a solution of hydrogen peroxide. The potassium hydroxide and sodium hydroxide are maintained in a mole ratio of from about 1:1 to 6:1, and preferably within a mole ratio of 1.5:1 to 2.5:1. The total amount of sodium hydroxide and potassium hydroxide which is added to the soluion should be at least sufficient to form the equivalent alkali metal peroxides with the added hydrogen peroxide.

Alternately, an aqueous, mixed, alkali metal peroxide solution can be prepared by dissolving a mixture of sodium peroxide and potassium peroxide in water, in which the molar ratio of the potassium peroxide to sodium peroxide is from about 1:1 to 6:1 and preferably about 1.5:1 to 2.5:1. In either case the resulting solution is identical; however, the former method is preferred for economic reasons because sodium peroxide and potassium peroxide are relatively expensive.

The above reaction mixture is maintained at temperatures below 5° C. and preferably within the range of 0° C. to 5° C. While the reaction can be carried out at temperatures of from about −10° C. to about 20° C., temperatures higher than 5° C. are not desired because losses in product due to decomposition become unacceptable. To the aqueous, mixed, alkali metal peroxide solution described above is added an aliphatic tertiary alcohol (having a water solubility of at least about 5% by weight) as a reaction promoter and solvent. Nitrilotriacetic acid (NTA) is then added to the aqueous mixture of alkali metal peroxide solution and aliphatic tertiary alcohol. Subsequently, the desired acyl chloride is added slowly to the above mixture with adequate cooling means to prevent the exothermic reaction from raising the temperature of the mixture above about 5° C.

The time required to add the two solutions together will vary depending upon the total quantity of reactants added, the extent of cooling means provided and the uniformity of mixing in the reaction vessel. However, commercial batches can be prepared in from about 3 to about 6 hours, depending upon the reactivity of the acyl chloride employed. Upon completion of the reaction, the reaction mixture which is clear and contains little or no undissolved peroxy acid salt crystals or other salt crystals, is acidified by the addition of an acid, desirably a mineral acid such as sulfuric acid or phosphoric acid. The resulting acidified solution separates into an upper alcohol layer containing substantially all of the peroxycarboxylic acid, and a lower aqueous layer containing substantially all of the inorganic salts produced in situ.

In the above process the aqueous, mixed, alkali metal peroxide solution should have active oxygen contents of about 1–3% by weight. Higher active oxygen contents can be employed. However, peroxide solutions having excessively high active oxygen contents should be avoided because they prevent the peroxycarboxylic acid salts from dissolving in the reaction mixture; substantially complete solution of these salts is necessary to facilitate recovery of the peroxycarboxylic acid from the residual reaction mixture. When the active oxygen content of the aqueous, mixed, alkali metal peroxide solution is lower than about 1%, acyl chloride may hydrolyze to the corresponding carboxylic acid and thus reduce the yield of the peroxycarboxylic acid product. At active oxygen contents of above about 1%, the hydrolysis of the precursor acyl halide is substantially reduced.

The aliphatic tertiary alcohols which have been found effective as the reaction promoters in this process are those having water solubilities above about 5% by weight. The preferred tertiary aliphatic alcohols are tertiary butyl alcohol and tertiary amyl alcohol. The tertiary alcohol is employed in amounts of from about a 2.0:1 to about a 5:1 weight ratio with respect to the precursor acyl halide. Larger amounts of the tertiary alcohol beyond the weight ratio of 5:1 are not preferred, since the increase in the tertiary alcohol content is obtained at the expense of using smaller amounts of water. Reduced amounts of water in the reaction mixture results in precipitation of the inorganic salt residues in the final reaction mixture, making separation of the tertiary alcohol layer from the aqueous layer difficult. If the weight ratio of the tertiary alcohol to the precursor acyl halide is smaller than 2.0:1 there will be an insufficient amount of tertiary alcohol to dissolve the peroxycarboxylic acid product after acidification of the reaction mixture. The resulting insoluble crystals of the peroxy acid will prevent separation of the tertiary alcohol layer from the aqueous layer in the final reaction mixture; instead, a thick and unworkable slurry will result. Further, an insufficient amount of tertiary alcohol will not promote the reaction and will result in decreased yields. The preferred amounts of tertiary alcohol in the reaction mixture are in weight ratios of from about 2.25:1 to about 3:1 with respect to the precursor acyl halide.

The nitrilotriacetic acid (NTA) need be present in the solution in very small amounts to exhibit its stabilizing effect. As little as 50 p.p.m. of NTA in the reaction mixture will be effective; the preferred amount is from about 100–500 p.p.m. of NTA. Larger amounts of NTA can be utilized without interfering with the reaction, but are wasteful and do not increase the stabilizing effect of the NTA.

The organic acyl halides which can be reacted according to this process are those containing aromatic, cycloaliphatic or aliphatic residues. These residues may be unsubstituted or substituted with groups such as halogens, $NO_2C\equiv N$, or methoxy groups. The aromatic and cycloaliphatic residues can also be substituted with aliphatic groups. The acyl halides can either be monobasic or dibasic. Monobasic carboxylic acid halides which can be employed include benzoyl chloride, isobutyryl bromide, naphthoyl chloride, octanoyl chloride, lauryl chloride, cyclohexanecarbonyl chloride and benzoyl bromide. Dibasic halides which can be employed include succinyl chloride, phthalyl chloride, sebacyl chloride and adipyl chloride. In addition, substituted carboxylic acid halides which can be reacted according to this process include chlorobenzoyl chloride, -chlorolauryl chloride, nitrobenzoyl chloride, cyanobenzoyl chloride, methoxybenzoyl chloride and methylbenzoyl bromide.

The organic acyl halide is added to the reaction mixture in a weight ratio of from about 1:8 to about 1:15 with respect to the total weight of the final reaction mixture. If weight ratios lower than 1:15 are employed, the final reaction mixture, upon acidification, does not separate completely into a tertiary alcohol layer and an aqueous layer. If weight ratios higher than 1:8 are employed, the reaction mixture becomes oversaturated and unable to solubilize the salts. The preferred ratio of acyl halide to the total reaction mixture is in a weight ratio of from about 1:9 to about 1:11.

At the commencement of the reaction, the reaction medium can either be homogeneous or heterogeneous depending upon the solubility of the tertiary alcohol in water. In the case of tertiary butyl alcohol, for example, the reaction medium will be homogeneous whereas with tertiary amyl alcohol, the reaction will be heterogeneous. During the major part of the reaction, some crystals of an intermediate product, such as benzoyl peroxide, will remain suspended in the reaction mixture. However, this intermediate converts, during the reaction, to the peroxycarboxylic acid salt which dissolves in the reaction medium. Accordingly, the final reaction mixture should be a liquid solution with little or no undissolved crystals.

The dissolved mixed alkali metal salts of the peroxycarboxylic acid are then converted to peroxycarboxylic acid by acidification with an acid such as sulfuric acid or phosphoric acid. Upon acidification, the reaction mixture separates into two layers, a tertiary alcohol layer and a lower water layer. The major portion of the peroxycarboxylic acid formed in the reaction (generally over 95%) dissolves in the upper tertiary alcohol layer, while the inorganic salt residues produced in situ dissolve in the lower aqueous layer. The tertiary alcohol layer is then decanted from the aqueous layer.

In the event that the organic peroxycarboxylic acid which is formed is not stable in a pure dry state, it can be stored in the form in which it is recovered, i.e., as a tertiary alcohol solution. If this is done, however, the tertiary alcohol solution should be cleansed by washing it with a 25% solution of $NaH_2PO_4$ or other water-soluble acidic salt, e.g., $NaHSO_4$ or $KH_2PO_4$, which can form an aqueous solution having a specific gravity greater than that of the alcohol solution for ease of separation. Alternatively, a solution of a weak acid, such as a 25% by weight aqueous phosphoric acid, can be employed to wash the alcohol solution. This washing removes the small amount of residual impurities present, such as unreacted hydrogen peroxide and inorganic potassium and sodium salts. In the absence of this washing, the tertiary alcohol does not stabilize the peroxy acid. If the organic peroxycarboxylic acid is stable in its dry state, it can be separated from the tertiary alcohol solvent by conventional means.

The process can be carried out either in a batch or in a continuous process. In a batch process, at the conclusion of the reaction, the reaction mixture is allowed to stand after acidification and the tertiary alcohol layer containing the peroxycarboxylic acid is removed by simple decantation. In the case of a continuous process, the feed reactants, i.e., the organic acyl halide and the aqueous mixed alkali metal peroxide solution are added continuously to the reactor along with make-up tertiary alcohol. A portion of the reaction mixture is removed continuously from the reactor, acidified, and decanted to remove the tertiary alcohol layer. The tertiary alcohol is separated from the peroxycarboxylic acid by conventional methods and recycled to the reactor for additional use. In this mnaner, peroxycarboxylic acid is continuously produced from the reactor as product.

The following examples are given to illustrate the present invention and are not deemed to be limitative thereof.

EXAMPLE 1

Run A—Process of the invention

In a two liter, four neck, round bottom flask, equipped with a laboratory stirrer there was placed 27 g. of sodium hydroxide and 89 g. of 85% potassium hydroxide dissolved in 375 ml. of distilled water. To this solution was added 200 p.p.m. (by weight of the entire reaction mixture) of nitrilotriacetic acid (NTA). The solution was then cooled and maintained between 2° and 5° C. and there was added 68 g. of 50% hydrogen peroxide, followed by 350 g. of tert-butanol. Thereafter, 150 g. of technical grade meta-chlorobenzoyl chloride was slowly added over a period of 165 minutes to the cooled solution while maintaining the temperature between 2° and 5° C. The mixture was subject to constant stirring and permitted to react at this temperature for an additional 45 minues to complete the reaction. At the end of this period, the reaction mixture was acidified with a solution of 75 g. of 85% phosphoric acid in 120 ml. of water and then was transferred to a separatory funnel. The acidified reaction mixture separated into two sharp liquid layers; the top layer, the tert-butanol layer contains substantially all of the meta-chloroperoxybenzoic acid product; the bottom layer contained the bulk of the in-situ-produced inorganic salts dissolved in water. The tert-butanol layer was then separated from the remaining aqueous layer, and the latter discarded. The tert-butanol layer was then slowly added into an equeous pool maintained in the bottom of a laboratory distillation unit. The tertiary butanol solution was distilled by the method set forth in Example 1, Run A of U.S. Patent 3,231,605. During the distillation, the still was maintained under a pressure of about 30 mm. of mercury and the liquid pool of water in the still was maintained at a temperature of about 30° C. The meta-chloroperoxybenzoic acid which precipitated in the aqueous pool in the still was separated by filtration, dried in a vacuum oven under reduced pressure and then weighed. The assay of the product was determined by idiometric titration as described in Anal. Chem. 20, 1061 (1948); it showed that the meta-chloroperoxybenzoic acid product constituted an 87.8% yield based on the technical grade meta-chlorobenzoyl chloride utilized. The product assay was 86.5%; the remainder was substantially all meta-chlorobenzoic acid.

Run B—Process without NTA added

By way of comparison a run was made identical to that of Run A except that no NTA was added. The yield of meta-chloroperbenzoic acid was 78.9% and the product assay was 79.0%.

Run C—Process with known peroxygen stabilizers

The following runs were made to compare the results of NTA with that of compounds which are known to have stabilizing effects on peroxygen compounds. In these runs the additive employed is set forth in Table 1 along with the concentration used. The runs were made exactly as set forth in Run A except that the additive specified in Table 1 was used in place of NTA. To facilitate comparison, the results of Run A (NTA added) and Run B (no additive used) are listed in Table 1.

TABLE 1

| Additive used | Additive concentration, p.p.m.[1] | Product yield percent[2] | Product assay (percent) |
|---|---|---|---|
| Versenes 80 (pentasodium salt of diethylenetriamine-pentacetic acid) | 200 | 78.3 | 77.9 |
| EDTA (tetrasodium salt of diethylenediaminetetracetic acid) | 200 | 79.0 | 78.6 |
| Dipicolinic acid | 200 | 79.2 | 79.5 |
| Tetrasodium pyrophosphate | 500 | 79.0 | 79.2 |
| Sodium salt of hydroxyethyl-diphosphonic acid | 200 | 77.8 | 81.9 |
| NTA (Run A) (nitrilotriacetic acid) | 200 | 87.8 | 86.5 |
| None (Run B) | | 78.9 | 79.0 |

[1] Stabilizer concentration is in parts per million of the total reaction mixture.
[2] Yields are based on technical grade m-chlorobenzoyl chloride, assay 94.9%.

EXAMPLE 2

The same procedure was used as in Example 1, except that the m-chlorobenzoyl chloride addition time was 240 minutes followed by an additional 45 minutes reaction time to complete the reaction. These runs were made in the absence of an additive, with NTA (nitrilotriacetic acid) and with other additives which are known peroxygen stabilizers. The additives and the amounts used are listed in Table 2 along with the yield of the product, m-chloroperoxybenzoic acid. The assay of the product, m-chloroperoxybenzoic acid, is also given in Table 2; the remainder was the mother acid, m-chlorobenzoic acid.

TABLE 2

| Additive used | Additive concentration, p.p.m.[1] | Product yield (percent)[2] | Product assay (percent) |
|---|---|---|---|
| None | | 75.4 | 75.6 |
| Versenex 80 | 200 | 76.0 | 75.5 |
| Dipicolinic acid | 200 | 76.2 | 75.8 |
| NTA | 200 | 86.0 | 86.3 |

[1] Stabilizer concentration is in parts per million of the total reaction mixture.
[2] Yields are based on technical grade m-chlorobenzoyl chloride assay 94.9%.

EXAMPLE 3

The process of Example 1 Run A was duplicated using the sodium salt of nitrilotriacetic acid instead of nitrilotriacetic acid. Substantially the same yield and assay were obtained as in Run A.

As shown in Tables 1 and 2, only the NTA additive was able to increase the yield and assay of the final product, m-chloroperoxybenzoic acid. In commercial production of this acid the optimum assay is from 85 to 90%, the remaining ingredient being m-chlorobenzoic acid. Assays of m-chloroperoxybenzoic acid above 90% are not desired because the solid becomes flammable on exposure to a flame; at about 90% assay and below the product does not ignite.

As used in this specification and claims, the term (NTA) nitrilotriacetic acid also refers to the alkali metal salts of nitrilotriacetic, e.g. sodium or potassium salt of nitrilotriacetic acid, since these salts yield the same radical as does the nitrilotriacetic acid when dissolved in the aqueous, alkaline reaction mixture.

Pursuant to the requirements of the patent statutes, the principle of this invention has been explained and exemplified in a manner so that it can be readily practiced by those skilled in the art, such exemplification including what is considered to represent the best embodiment of the invention.

What is claimed is:
1. In the process of producing a peroxycarboxylic acid by reaction of (a) the acyl halide of the peroxycarboxylic to be produced, with (b) an aqueous alkali metal peroxide solution containing as the alkali metals a mixture of po- tassium and sodium ions in a mole ratio of about 1:1 to about 6:1, said solution having an active oxygen content of above about 1% by weight, in a reactive medium comprising (c) water and a tertiary alcohol having water solubility of above about 5% by weight, wherein said reaction is carried out for periods of time up to about six hours, and wherein said mixture is acidified and a tertiary alcohol layer rich in said peroxycarboxylic acid is separated from a water layer poor in peroxycarboxylic acid and containing the in-situ-produced inorganic salts, the improvement which comprises carrying out said reaction in the presence of at least about 50 p.p.m. of nitrilotriacetic acid.

2. Process of claim 1 in which the tertiary alcohol in said reaction medium (C) is tert-butanol, said weight ratio of said acyl chloride (A) to tert-butanol is from about 1:2.25 to 1:3, said weight ratio of said acyl halide (A) to the total reaction mixture is from about 1:8 to 1:11, and the mole ratio of said potassium ions to said sodium ions in the aqueous alkali meal peroxide solution (B) is from about 1.5:1 to 2.5:1.

3. Process of claim 1, where said peroxycarboxylic acid is m-chloroperoxybenzoic acid.

4. Process of claim 1 where said nitrilotriacetic acid is used in effective amounts up to about 500 p.p.m. of the reaction mixture.

References Cited

UNITED STATES PATENTS

| | | | |
|---|---|---|---|
| 3,232,979 | 2/1966 | Blumbergs | 260—502 |
| 3,122,417 | 2/1964 | Blaser | 260—610 |

FOREIGN PATENTS

| | | |
|---|---|---|
| 1,016,356 | 1/1966 | Great Britian. |

OTHER REFERENCES

Dyatlova et al., Russian Chemical Review, vol. 34, No. 7, pp. 481–493, July 1963.

BERNARD HELFIN, Primary Examiner

W. B. LONE, Assistant Examiner